United States Patent
Gilmore

(10) Patent No.: US 8,598,852 B2
(45) Date of Patent: Dec. 3, 2013

(54) COST EFFECTIVE CONFIGURATION FOR SUPERCAPACITORS FOR HEV

(75) Inventor: Curt Douglas Gilmore, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 681 days.

(21) Appl. No.: 12/606,802

(22) Filed: Oct. 27, 2009

(65) Prior Publication Data

US 2010/0116574 A1    May 13, 2010

Related U.S. Application Data

(60) Provisional application No. 61/113,767, filed on Nov. 12, 2008.

(51) Int. Cl.
*H02J 7/00* (2006.01)
*B60K 1/00* (2006.01)

(52) U.S. Cl.
USPC ....... 320/167; 180/65.1; 180/65.21; 180/54.1

(58) Field of Classification Search
USPC .......................................................... 320/167
See application file for complete search history.

(56) References Cited

U.S. PATENT DOCUMENTS

| | | | |
|---|---|---|---|
| 5,318,142 A * | 6/1994 | Bates et al. | 180/65.245 |
| 5,713,426 A * | 2/1998 | Okamura | 180/65.245 |
| 5,960,898 A * | 10/1999 | Okada et al. | 180/65.8 |
| 6,606,245 B2 | 8/2003 | Oda et al. | |
| 6,777,917 B2 * | 8/2004 | Desprez et al. | 320/167 |
| 6,995,480 B2 | 2/2006 | Amano et al. | |
| 7,096,985 B2 * | 8/2006 | Charaudeau et al. | 180/65.245 |
| 7,345,454 B2 * | 3/2008 | Thrap | 320/135 |
| 7,407,025 B2 | 8/2008 | Urakabe et al. | |
| 7,427,450 B2 | 9/2008 | Raiser | |
| 7,533,745 B2 | 5/2009 | Laeuffer | |
| 7,541,782 B2 * | 6/2009 | Narendra et al. | 320/167 |
| 2003/0089557 A1 | 5/2003 | Eilinger | |
| 2003/0214270 A1 | 11/2003 | Shiue et al. | |
| 2004/0065489 A1 * | 4/2004 | Aberle et al. | 180/65.1 |
| 2007/0093359 A1 * | 4/2007 | Kobayashi et al. | 477/107 |
| 2008/0106239 A1 * | 5/2008 | Cegnar | 320/167 |
| 2008/0129219 A1 * | 6/2008 | Smith et al. | 315/291 |

OTHER PUBLICATIONS

International Search Report for International Patent Application No. PCT/US2009/063335, dated Jun. 1, 2010.

* cited by examiner

*Primary Examiner* — Yalkew Fantu
(74) *Attorney, Agent, or Firm* — Harness, Dickey & Pierce, P.L.C.

(57) ABSTRACT

A rechargeable energy storage system (RESS) for a hybrid electric vehicle includes a power supply module that includes at least one battery. A startup module includes N supercapacitors arranged in parallel with the at least one battery, wherein N is an integer greater than or equal 1, and an adjustable power supply arranged in series with at least one of the N supercapacitors and in parallel with the at least one battery, wherein the adjustable power supply maintains a voltage across the N supercapacitors below a predetermined voltage.

20 Claims, 3 Drawing Sheets

COST EFFECTIVE CONFIGURATION FOR SUPERCAPACITORS FOR HEV

FIELD

The present disclosure relates to a power supply for an electric vehicle and, more particularly, to a supercapacitor configuration for a hybrid electric vehicle with reduced size and complexity.

BACKGROUND

The statements in this section merely provide background information related to the present disclosure and may not constitute prior art.

Varying power demands (e.g. stop-and-go driving and/or quick acceleration) in a conventional propulsion system may cause the system to operate inefficiently. For example, the conventional propulsion system may include an internal combustion engine. Inefficiencies in the engine lead to increased fuel consumption and increased emissions.

A hybrid electric vehicle (HEV) merges features of the conventional propulsion system with those of an electrical vehicle system. For example, the HEV may include the conventional propulsion system and an on-board rechargeable energy storage system (RESS) that improves fuel economy and performance. The conventional propulsion system and/or a regenerative brake provide energy to the RESS, which stores the energy for later use. The RESS uses the stored energy to drive the vehicle during acceleration periods. Consequently, the conventional propulsion system operates only when at optimum efficiency. The RESS may include a bank of batteries to provide storage. Typically, improvement in fuel economy of the vehicle corresponds to storage capacity and other characteristics of the RESS.

SUMMARY

A rechargeable energy storage system (RESS) for a hybrid electric vehicle includes a power supply module that includes at least one battery. A startup module includes N supercapacitors arranged in parallel with the at least one battery, wherein N is an integer greater than or equal to 1, and an adjustable power supply arranged in series with at least one of the N supercapacitors and in parallel with the at least one battery, wherein the adjustable power supply maintains a voltage across the N supercapacitors below a predetermined voltage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
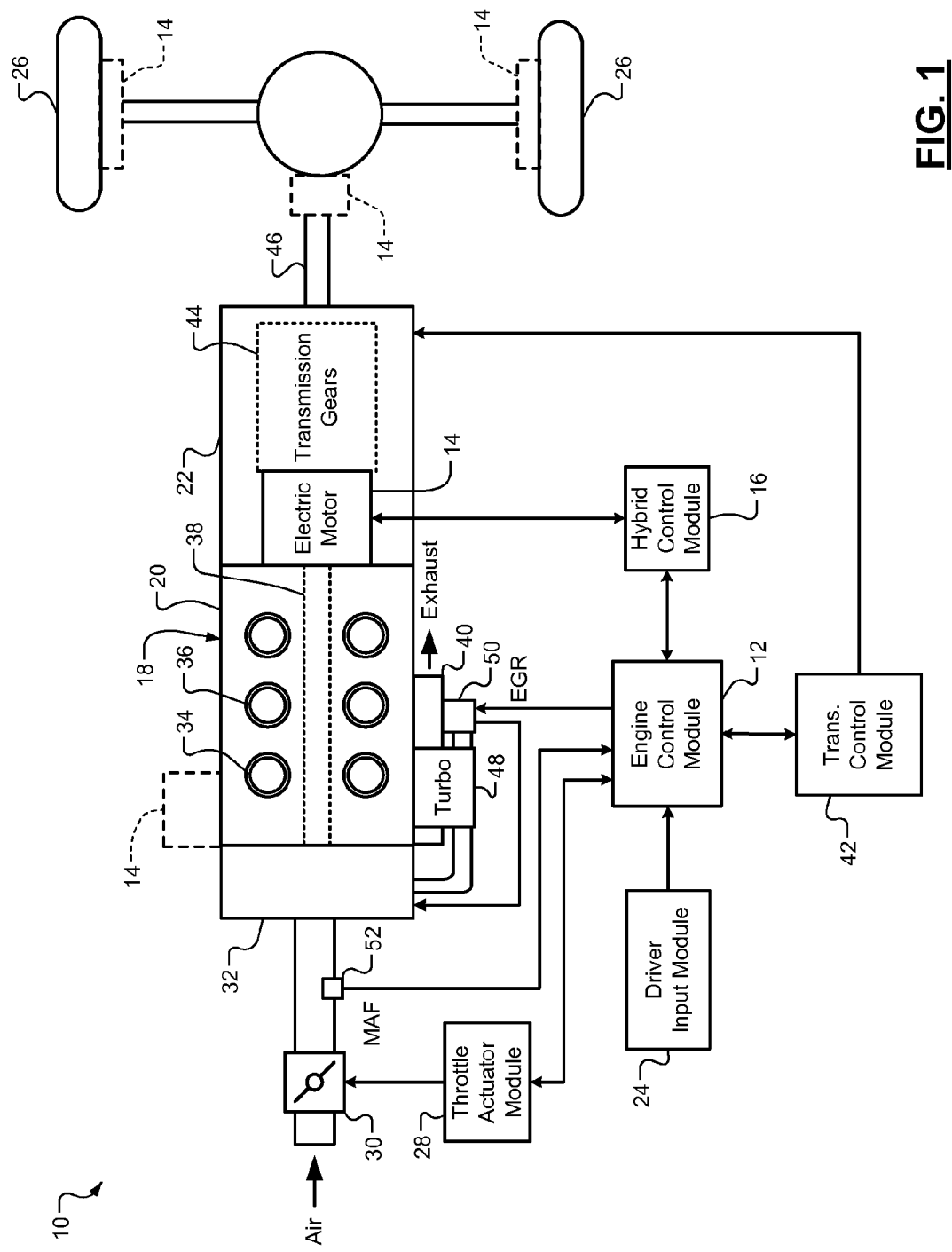
FIG. 1 is a functional block diagram of an exemplary engine system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary hybrid electric vehicle (HEV) power supply system 10 is shown. The power supply system 10 includes an engine control module (ECM) 12, an electric motor 14, a hybrid control module 16, a conventional propulsion system 18, including an internal combustion or a diesel engine 20, and a transmission 22. The ECM 12 may use signals received from various vehicle sensors, such as those received from a Driver Input Module 24, to make control decisions for the power supply system 10. The ECM 12 provides signals to various modules for driving at least one vehicle wheel 26 with a requisite torque.

The ECM 12 may require that the electric motor 14, the engine 20, or a combination of the electric motor 14 and the engine 20 drive the vehicle wheels 26. The engine 20 and the electric motor 14 are situated in a parallel drivetrain arrangement, as shown. In the parallel drivetrain arrangement, the electric motor 14 and the engine 20 are mechanically coupled to combine the torque supplied by each for a total output power. The ECM 12 determines the exact balance of power between the electric motor 14 and the engine 20 for greatest system efficiency and may optionally vary the split over time.

The engine 20 and the electric motor 14 may also be in a series drivetrain arrangement or a series/parallel-combined drivetrain arrangement (not shown). In the series drivetrain arrangement, the engine 20 drives a generator, instead of directly driving the wheels 26. The generator powers the electric motor 14 that then drives the transmission 22. The series/parallel-combined drivetrain arrangement has features of both series and parallel drivetrain arrangements. The series/parallel-combined drivetrain arrangement includes a power splitting device that allows the engine 20 to drive the wheels 26 directly through mechanical means (e.g. supplying torque directly to the wheels 26) or indirectly through electrical means (e.g. supplying torque to the electric motor 14).

The ECM 12 sends a command to a throttle actuator module 28 to regulate opening of a throttle valve 30 to control the amount of air drawn into an intake manifold 32. Air from the intake manifold 32 is drawn into N cylinders 34 of the engine 20. Although FIG. 1 depicts the engine 20 having six cylinders 34 (N=6), it should be understood that the engine 20 may include additional or fewer cylinders 34. By way of example, the engine 20 may include 2, 3, 4, 5, 6, 8, 10, 12 and/or 16 cylinders.

The air entering the cylinders 34 combusts with fuel, reciprocally driving down pistons 36 located within the cylinders 34. The reciprocating pistons 36 rotatably drive a crankshaft 38, which provides a constant drive torque to the transmission 22. The pistons 36 then begin moving up again and expels the byproducts of combustion. The byproducts of combustion are exhausted from the vehicle via an exhaust system 40.

The ECM 12 may communicate with a transmission control module 42 to coordinate shifting gears in the transmission 22 when information relayed from the various vehicle sensors (e.g. the Driver Input Module 24) indicates the need for an increase or decrease in vehicle acceleration. The transmission 22 translates the constant drive torque from the crankshaft 38 through a series of gears 44 utilizing a plurality of gear ratios (e.g. 3-speed, 4-speed, 5-speed, 6-speed, etc) to an output driveshaft 46. The driveshaft 46 then distributes the drive torque to the vehicle wheels 26.

The engine 20 may also employ a boost device, such as a turbocharger 48, which provides pressurized air to the intake manifold 32; an exhaust gas recirculation (EGR) valve 50, which selectively redirects exhaust gas back to the intake manifold 32; and/or a mass air flow (MAF) sensor 52, which measures the mass of air flowing into the intake manifold 32.

The ECM 12 sends a command to the hybrid control module 16 when power is required from the electric motor 14. The hybrid control module 16 uses stored power to drive the motor 14, which drives the transmission 22. Those skilled in the art can appreciate that the motor 14 may be arranged in various additional and/or alternative locations in the vehicle, such as on the driveshaft 16 and/or near the wheels 26, and may include a belt driven charger. The motor 14 may also be used to produce electrical energy for use by vehicle electrical systems and/or for storage in a battery. In various implementations, the ECM 12, the transmission control module 42, and the hybrid control module 16 may be integrated into one or more modules.

Figure 2:
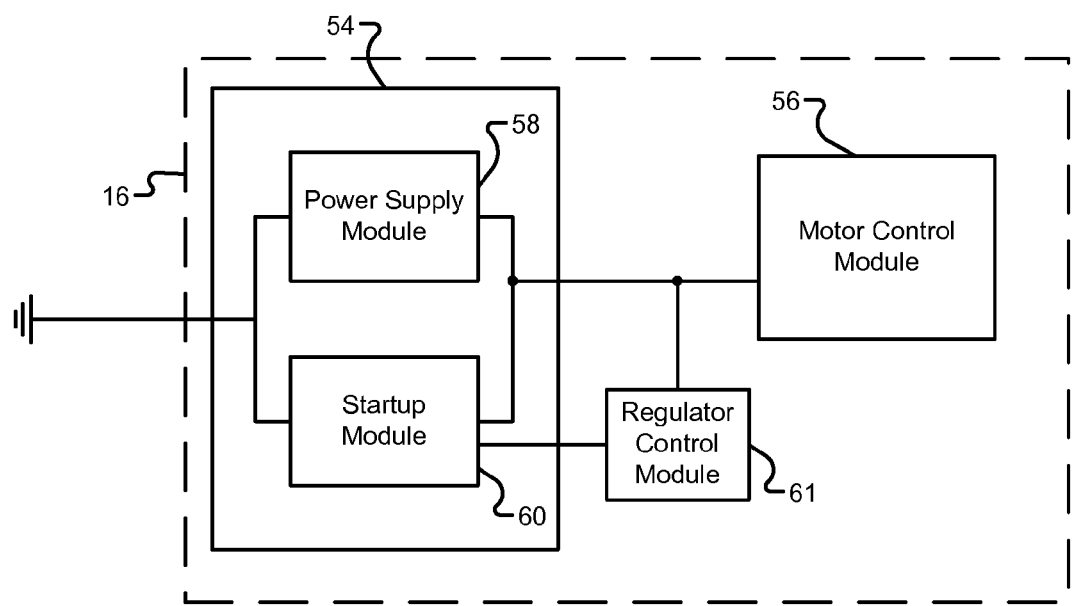
FIG. 2 is a functional block diagram illustrating a hybrid control module according to the present disclosure.

Referring now to FIG. 2, the hybrid control module 16 includes an on-board rechargeable energy storage system (RESS) module 54 and a motor control module 56. The RESS module 54 includes a power supply module 58, a startup module 60, and a regulator control module 61. The power supply module 58 may be used to generate a steady supply of energy, while the startup module 60 may provide a high current for a short time. The regulator control module 61 selectively activates and deactivates the startup module 60 as described in further detail in FIG. 3. The motor control module 56 receives power from the RESS module 54 to drive the motor 14.

Figure 3:
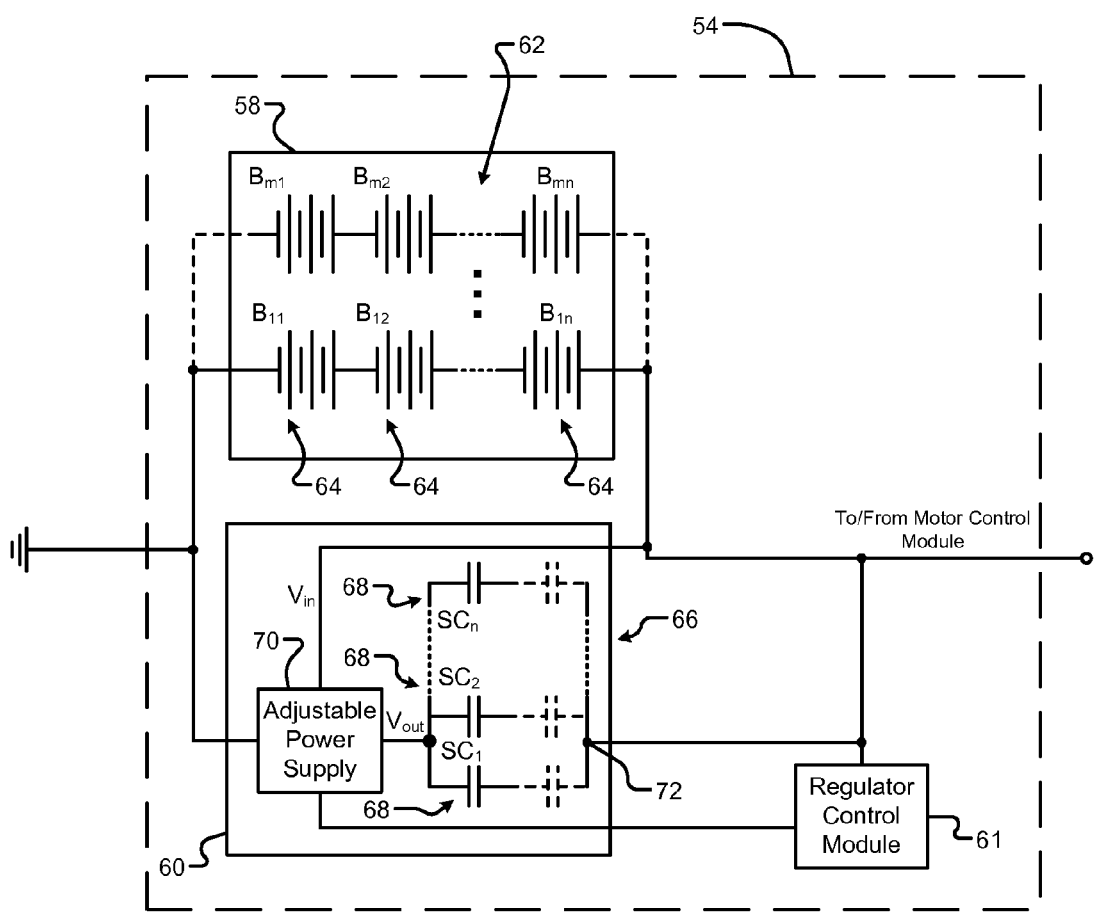
FIG. 3 is a schematic diagram illustrating a rechargeable energy storage system module according to the present disclosure.

Referring now to FIG. 3, the power supply module 58 may include a battery bank 62 that includes a plurality of batteries 64. The batteries 64 include batteries $B_1, B_2, \ldots,$ and $B_n$ arranged in a series configuration. Although the battery bank 62 is shown to include a single group of the batteries 64 connected in parallel, those skilled in the art can appreciate that other configurations of batteries may be used, including, but not limited to, a matrix configuration and additional groups of series connected batteries. Accordingly, the voltage supplied by the battery bank 62 corresponds to a sum of the voltages of individual ones of the batteries 64 while maintaining the same capacity rating. Conversely, when the batteries 64 are connected in parallel, the capacities of the batteries 64 are summed while the battery bank 62 has an effective voltage equal to one of the batteries 64. It should be noted that any combination or number of the batteries 64 could be used in the battery bank 62 to provide the requisite storage capacity in the allotted space constraints.

While the battery bank 62 is capable of storing large amounts of energy, the motor 14 may require very high currents for short time periods (e.g. during startup and acceleration maneuvers). Accordingly, the startup module 60 includes a supercapacitor bank 66 placed in a parallel arrangement with the battery bank 62. The supercapacitor bank 66 is also able to quickly and efficiently store power generated during a regenerative braking operation or during vehicle deceleration. The power supply system 10 may also be included in a plug-in HEV. For example, the power supply system 10 may be configured to plug in to a standard AC power receptacle to charge the battery bank 62 and/or the supercapacitor bank 66. Output currents of the supercapacitor bank 66 and the battery bank 62 are summed to start the motor 14. The supercapacitor bank 66 and the battery bank 62 may also be used to operate the motor 14 during normal operation.

The supercapacitor bank 66 may have a working voltage less than, equal to, or greater than the battery bank 62. As shown, the supercapacitor bank 66 includes supercapacitors 68 ($SC_1, SC_2, \ldots,$ and $SC_n$) arranged in a parallel configuration. Although as shown the supercapacitor bank 68 includes single capacitors 68 connected in parallel, other configurations may be used, including, but not limited to, two or more capacitors connected in series and/or one or more groups of series connected capacitors connected in parallel with other groups of series connected capacitors. The supercapacitors 68, such as ultracapacitors or electrochemical double layer capacitors (EDLC), use a microscopic charge separation at an electrochemical interface to store energy. In particular, the supercapacitor bank 66 stores an electrical charge on an electrode. The battery bank 62 creates an electrical charge at the electrodes to generate energy. The capacitance of the supercapacitors 68 is proportional to an active electrode surface area. Therefore, increasing the electrode surface area will increase the capacitance. This is achieved by utilizing porous materials in the supercapacitors 68 to increase the active electrode surface area without increasing the size of the device.

The supercapacitor bank 66 has an effective capacitance of $SC_{total}$ according to the following equation:

$$SC_{total}=SC_1+SC_2+\ldots+SC_n$$

Placing the supercapacitors 68 in a parallel arrangement allows for a more effective usage of the available power. It is understood that any number of supercapacitors 68 may be placed within the parallel configuration to obtain the required system capacitance.

Individual ones of the supercapacitors 68 may be limited to low voltages. Supercapacitors rated for higher voltages are typically made of matched series-connected individual supercapacitors. Accordingly, the RESS module 54 of the present disclosure includes an adjustable power supply 70 (such as an adjustable switching regulator) connected in series with the supercapacitor bank 66. For example only, the adjustable power supply 70 may include a low cost/high efficiency power supply. Although the adjustable power supply 70 is shown connected in series with the supercapacitor bank 66, those skilled in the art can appreciate that the adjustable power supply 70 may be arranged in other suitable locations.

A reference voltage terminal (i.e. ground) of the adjustable power supply 70 is connected to a negative terminal side of the battery bank 62. The adjustable power supply 70 receives power from a positive terminal side of the battery bank 62 of the power supply module 58. A positive terminal of the adjustable power supply 70 is connected to a low voltage side of the supercapacitor bank 66. The adjustable power supply 70 regulates the amount of voltage across the supercapacitors 68 by reducing an output voltage of the adjustable power supply 70 to a value less than a voltage at a positive terminal side of the battery bank 62. For example, the adjustable power supply 70 prevents the voltage across the supercapacitors from exceeding a predetermined threshold.

The regulator control module 61 communicates with the adjustable power supply 70 to regulate the amount of voltage across the supercapacitors 68. For example, the regulator control module 61 may monitor a voltage at a node 72. The voltage at the node 72 is indicative of the voltage across the supercapacitor bank 66. When regulator control module 61 determines that the voltage at the node 72 exceeds the predetermined threshold, the regulator control module 61 adjusts the adjustable power supply 70 accordingly. The regulator control module 61 may adjust the adjustable power supply 70 to reduce the voltage across the supercapacitor bank 66 to allow the supercapacitors 68 to charge. For example, reducing the voltage via the adjustable power supply 70 allows current to flow from the motor control module (e.g. during deceleration) into the supercapacitors 68. Accordingly, reducing the voltage of the adjustable power supply 70 allows the supercapacitors 68 to charge quickly and efficiently.

In this manner, the hybrid control module 16 powers the motor 14 with the supercapacitor bank 66 during startup and may continue powering with the battery bank 62 during normal operation. Further, the hybrid control module 16 may rapidly store energy in the supercapacitor bank 66 during regenerative braking or normal deceleration, and steadily store energy in the battery bank 62 during normal vehicle operation.

This description is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A rechargeable energy storage system (RESS) for a hybrid electric vehicle comprising:
   a power supply module that includes at least one battery; and
   a startup module that includes:
     N supercapacitors, wherein each of the N supercapacitors is arranged in parallel with others of the N supercapacitors and with the at least one battery, and wherein N is an integer greater than one; and
     an adjustable power supply arranged in series with at least one of the N supercapacitors and in parallel with the at least one battery,
     wherein the adjustable power supply maintains a voltage across the N supercapacitors below a predetermined voltage.

2. The RESS of claim 1 further comprising a regulator control module that monitors the voltage across the N supercapacitors and selectively adjusts the voltage based on a comparison between the voltage and the predetermined voltage.

3. A system comprising the RESS of claim 1 and further comprising:
   a motor control module arranged at least one of in series and in parallel with the N supercapacitors.

4. The system of claim 3 wherein the N supercapacitors provide current to the motor control module during at least one of a startup period and normal operation of the hybrid electric vehicle.

5. The RESS of claim 1 wherein the N supercapacitors are charged during at least one of regenerative breaking, normal deceleration, and acceleration of the hybrid electric vehicle.

6. The RESS of claim 1 wherein a voltage of the adjustable power supply is less than or equal to a predetermined threshold voltage for the N supercapacitors.

7. The RESS of claim 1 further comprising at least one supercapacitor connected in series with at least one of the N supercapacitors.

8. A rechargeable energy storage method for a hybrid electric vehicle comprising:
   providing at least one battery;
   arranging each of N supercapacitors in parallel with the at least one battery, wherein N is an integer greater than or equal to one; and
   arranging an adjustable power supply in series with at least one of the N supercapacitors and in parallel with the at least one battery, wherein the adjustable power supply maintains a voltage across the N supercapacitors below a predetermined voltage.

9. The method of claim 8 further comprising:
   monitoring the voltage across the N supercapacitors using a regulator control module; and
   selectively adjusting the voltage based on a comparison between the voltage and the predetermined voltage.

10. The method of claim 8 and further comprising:
    arranging a motor control module in parallel with the N supercapacitors.

11. The method of claim 10 wherein the N supercapacitors provide current to the motor control module during at least one of a startup period and normal operation of the hybrid electric vehicle.

12. The method of claim 8 wherein the N supercapacitors are charged during at least one of regenerative breaking, normal deceleration, and acceleration of the hybrid electric vehicle.

13. The method of claim 8 wherein a voltage of the adjustable power supply is less than or equal to a predetermined threshold voltage for the N supercapacitors.

14. The method of claim 8 wherein at least one supercapacitor is connected in series with at least one of the N supercapacitors.

15. A system for a hybrid electric vehicle, the system comprising:
    a battery system that includes a plurality of batteries connected in series, the battery system being configured to output a current for powering an electric motor of the hybrid electric vehicle, wherein the electric motor is configured to propel the hybrid electric vehicle;
    a supercapacitor system that includes a plurality of supercapacitors connected in parallel, the supercapacitor system being connected in parallel to the battery system and being configured to output additional current for powering the electric motor of the hybrid electric vehicle when a current requested by the electric motor is greater than the current being output by the battery system; and
    an adjustable switching regulator connected between the battery system and the supercapacitor system, the adjustable switching regulator being configured to maintain a voltage across the supercapacitor system at less than or equal to a predetermined voltage threshold and to enable recharging of the supercapacitor system.

16. The system of claim 15, wherein a reference terminal of the adjustable switching regulator is connected to a negative terminal of the battery system, wherein an input terminal of the adjustable switching regulator is connected to a positive terminal of the battery system, and wherein an output terminal of the adjustable switching regulator is connected to a reference node of the supercapacitor system.

17. The system of claim 16, wherein the adjustable switching regulator is configured to enable recharging of the supercapacitor system during at least one of vehicle deceleration and regenerative braking by decreasing the voltage across the supercapacitor system.

18. The system of claim 17, wherein the adjustable switching regulator is configured to enable recharging of the supercapacitor system during at least one of vehicle deceleration and regenerative braking by decreasing the voltage across the supercapacitor system to a voltage less than a voltage at the positive terminal of the battery system.

19. The system of claim 15, wherein each of the plurality of supercapacitors includes a porous material that increases an active electrode surface area of each of the plurality of supercapacitors.

20. The system of claim 15, wherein recharging of the battery system is enabled during steady-state vehicle operation, and wherein an internal combustion engine of the hybrid electric vehicle is configured to propel the hybrid electric vehicle during the steady-state vehicle operation.

* * * * *